April 28, 1970  J. MARTIN  3,508,644
APPARATUS FOR STOWING CABLES
Filed April 10, 1968  3 Sheets-Sheet 1

Inventor
JAMES MARTIN
By Kurt Kelman
Agent

April 28, 1970   J. MARTIN   3,508,644
APPARATUS FOR STOWING CABLES
Filed April 10, 1968   3 Sheets-Sheet 3

Inventor
JAMES MARTIN
By Kurt Kelman
AGENT

United States Patent Office 3,508,644
Patented Apr. 28, 1970

3,508,644
APPARATUS FOR STOWING CABLES
James Martin, Southlands Manor, Southlands Road,
Denham, near Uxbridge, England
Filed Apr. 10, 1968, Ser. No. 720,256
Claims priority, application Great Britain, June 21, 1967,
28,553/67
Int. Cl. B64d *25/10;* B65d *85/04*
U.S. Cl. 206—52                                       4 Claims

ABSTRACT OF THE DISCLOSURE

Apparatus for stowing a cable, such apparatus comprising; a former and retaining means, such means being adapted to retain a portion of a coiled cable in a coiled condition on the former until a separating force in excess of a pre-determined value exists between said retaining means and said cable.

---

This invention concerns a method of, and apparatus for, stowing lines, cables, straps and the like (all hereinafter referred to as "cables"). In particular this invention concerns apparatus for stowing a rocket motor initiator line for a vehicle ejection seat but it should be appreciated that the invention may have other applications either in connection with vehicle ejection seats or wholly independent of such seats.

In certain ejection seats of the kind which utilize a rocket motor or pack of rocket motors to assist an ejection gun of the seat during the ejection sequence, such rocket motor or pack of rocket motors include at least one rocket initiator mechanism having a spring biassed firing pin which is tensioned and released as a result of withdrawal of a sear, such sear being connected to one end of a cable whilst the other end of such cable is secured to a part of the structure of the aircraft carrying the seat. The cable is dimensioned so that after the ejection seat has moved in an ejection direction with respect to the seat by a pre-determined amount, the line becomes taut and further movement of the seat out of the aircraft results in withdrawal of the sear and firing of the rocket motor or pack of rocket motors.

With such an arrangement for actuating the rocket motor initiator mechanism it is conceivable that such cable may, for example after servicing of the seat, be incorrectly stowed and may, as a result of this incorrect stowing, become entangled with a projection in the cockpit of the aircraft with the result that the effective length of the cable is shortened and premature withdrawal of the sear and premature firing of the rocket motor (or pack of rocket motors) will occur during the ejection sequence.

One object of this invention is to provide apparatus for stowing a cable (such as a rocket motor sear withdrawal line of an aircraft ejection seat) so as to provide (when used in conjunction with ejections seats) a more satisfactory, more reliable and a safer means of firing the rocket motor or pack of rocket motors. It is a particular object of this invention to obviate or at least reduce the possibility of the specific aforementioned disadvantages. A further object of the invention, however, is to provide a compact and simple apparatus for stowing a cable.

Thus according to one aspect of this invention there is provided apparatus for stowing a cable, such apparatus comprising a former and frangible retaining elements adapted to retain a portion of a coiled cable in a coiled condition on the former until a separating force in excess of a pre-determined value exists between said retaining elements and said cable, and releases sequential lengths of the coiled cable.

Whilst the term "coiled" may be construed as wound in a spiral or circular condition, for the purposes of this specification, the term is used to embrace other stowing formations such as for example, a zig-zag formation.

In one embodiment of the apparatus in accordance with this invention said former may comprise a plate provided with a groove (for example, spiral), in one face thereof for said cable, such groove being dimensioned to accommodate at least a portion of said cable lying therewithin. Preferably, such groove may be dimensioned and shaped so that the coiled portion of the cable may lie wholly within the groove.

Very conveniently, a plurality of frangible retaining elements traverse an open side of portions of said groove.

According to one feature of this invention one part of the cable adjacent said coiled portion of the cable may be embraced by a clip having one or more tongues adapted to pass through an opening or openings in the plate and to be bent so as releasably to retain the part of the cable embraced by such clip adjacent said plate. The part of the cable adjacent the coiled portion which is remote from the clip may be retained adjacent the plate in a similar manner by a second clip.

According to yet another feature of the invention there is provided an ejection seat having an ejection gun and at least one rocket motor, said rocket motor being initiated as a result of tensioning of a static line extending between said ejection seat and a vehicle housing such ejection seat, such static line comprising a cable, a portion of such cable being coiled on apparatus in accordance with this invention, this arrangement being such that lengths of said coiled portion of the cable are sequentially released from the former when a separating force in excess of a pre-determined value exists between the retaining means and said cable.

In order that the invention may be more readily understood one embodiment of cable stowage apparatus which is suitable for stowing an initiator cable or static line for a rocket motor (or pack of rocket motors) for an ejection seat will now be described by way of example, such apparatus being shown secured to an ejection seat:

Figure 1:
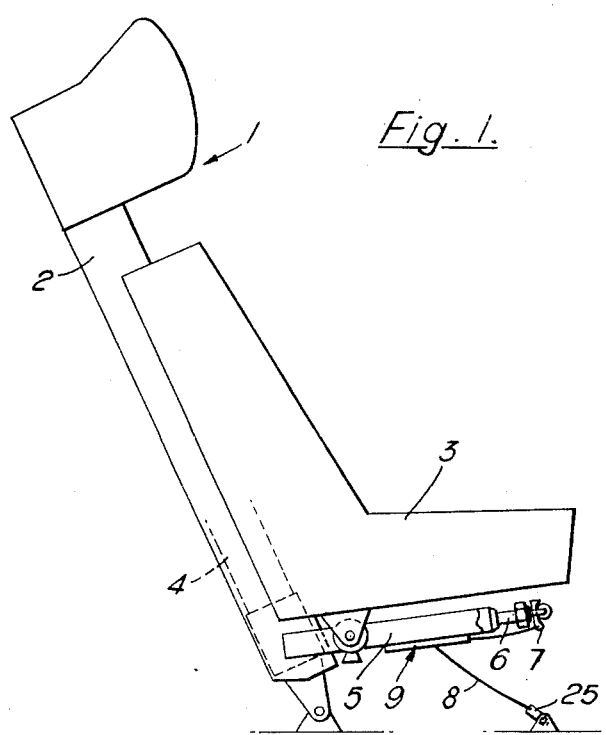
FIGURE 1 is a side elevational view of an ejection seat having a rocket motor situated beneath the same and carrying a cable stowage apparatus in accordance with this invention.
Figure 2:
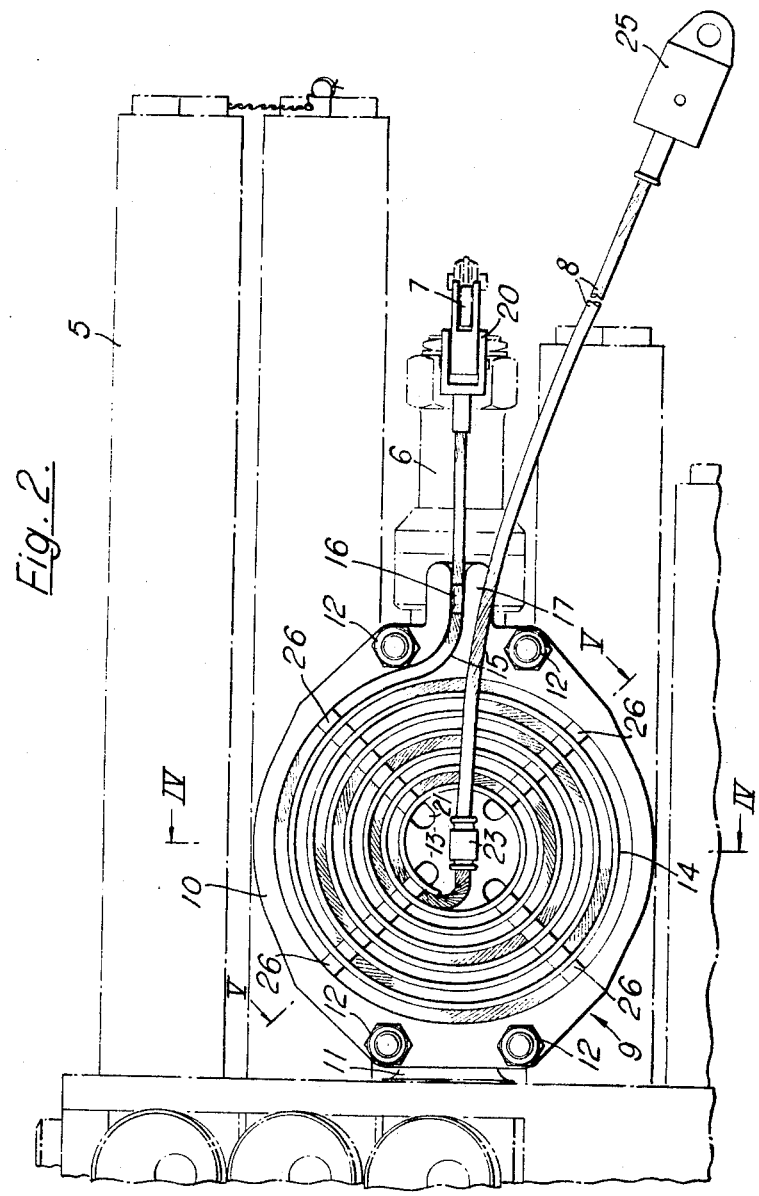
FIGURE 2 is an underneath plan view of the cable stowage device, portions of the rocket motor to which it is attached being shown in dot-and-pic lines.
Figure 3:
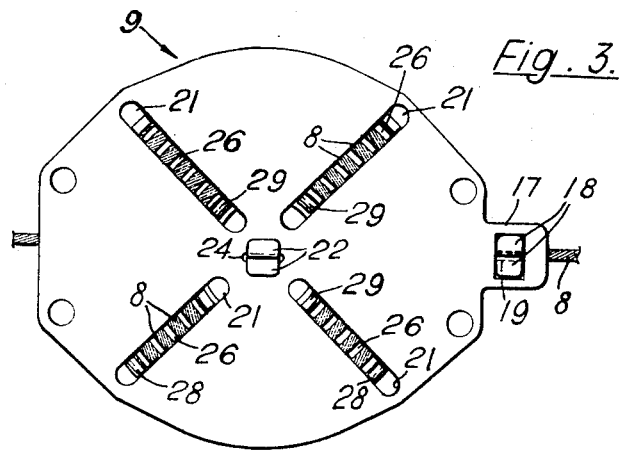
FIGURE 3 is a plan view of the stowage device.
Figure 4:
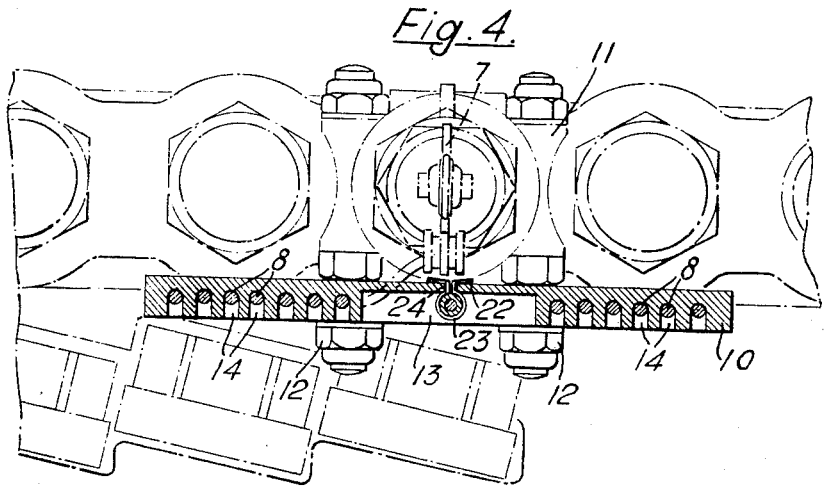
FIGURE 4 is a section on the line IV—IV of FIGURE 2, portions of the rocket motor again being shown in dot-and-pic lines.
Figure 5:
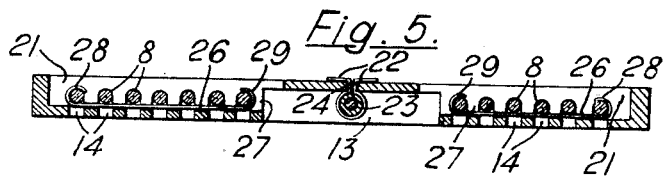
FIGURE 5 is a section on the line V—V of FIGURE 2.

FIGURE 1 shows an ejection seat 1 having a frame 2, seat pan 3, ejection gun 4 and a pack of rocket motors 5 initiated by firing mechanism 6 actuated by withdrawal of a sear 7 by a cable 8 normally stowed in a stowage apparatus generally designated 9. One end portion of the cable is secured to the sear 7 whilst the opposite end portion is secured to the floor of the vehicle (for example aircraft) in which the seat 1 is situated, an intermediary portion of the cable being coiled on the stowage apparatus 9.

The stowage apparatus 9 comprises a generally circular flat metal plate 10 adapted to be secured to studs passing through brackets 11 provided on the underside of the pack of rocket motors 5 by nuts 12.

One surface of the plate 10 is provided with a central circular recess 13 from which emanates a substantially spiral groove 14. This groove 14 is formed in the face of the plate which lies remote from the rocket pack and an end 15 of the groove 14 remote from this recess 13 is curved outwardly so that it terminates in a direction which is disposed substantially radially of the plate 10. Lying in said groove 14, so as to be coiled, is an intermediate portion of the cable 8. The groove 14 is dimensioned to permit this coiled intermediate portion of the cable to lie wholly therewithin.

The end part of this cable which lies in the outermost part of the spiral groove (i.e. in the radially disposed portion 15) is retained adjacent the plate by a clip 16 engaging about a radial extension 17 formed on the plate 10. This clip is formed from a deformable metal and has a pair of tongues 18 which pass through an aperture 19, the tongues 18 being bent so that they are retained in the aperture 19. The terminal portion of this end of the cable 8 carries a shackle 20 by which the cable may be secured to the withdrawable sear 7 of the firing mechanism 6 of the rocket motor pack 5.

The end part of the cable which emanates from the inner end of the spiral groove 14 is retained adjacent the centre of the plate by tongues 22 extending from a metal clip 23 swaged on to the cable 8, these tongues 22 extending through an opening 24 in the plate 10 and having their end portions turned outwardly to engage the back face of the plate. In this way such end part is retained adjacent the plate.

The terminal end of the part of the cable 8 emanating from the inner end of the spiral is also provided with a shackle, designated 25, which is adapted to be secured to a part of the structure of the aircraft carrying the seat.

To retain the coiled portion of the cable 8 which lies within the groove 14, four thin substantially flat frangible retaining strips 26 are provided, such strips 26 being formed from any suitable frangible material which may conveniently be a light metal alloy. These strips are each respectively introduced into one of four slots 27 provided in the plate. The slots 27 radiate from the recessed centre of such plate so as to traverse the spiral groove 14 at a position immediately to the front of the cable 8 stowed in such groove 14. It will be appreciated that each of these strips will retain the coiled portion of the cable safely in the groove.

To prevent accidental withdrawal of the strips 26 from the slots 27, the opposite end portions 28, 29 of the strips are deformed, so that they lie around a portion of the cable 8 situated in the groove.

To enable the end portions 28 and 29 of the strips 26 to be deformed radially disposed cut-outs 21 are provided in the plate.

It will be appreciated that when ejection of the seat is initiated the seat 1 moves out of the aircraft (under the power of the ejection gun 4 of the seat) and the relative movement between the ejection seat 1 and the aircraft structure will result in the anchorage points of the opposite terminal ends of the cable 8 moving away from one another and a force tending to separate the cable 8 from its position in the groove 14 of the plate 10 will occur.

When such force reaches and exceeds a pre-determined value, the tongues 22 of the clip 23 will deform and the portion of the cable carrying the clip 23 will be drawn away from the plate 10. Continued movement of the seat 1 away from the aircraft structure will then result in the orderly sequential paying-out of the cable, portions of each of the radially positioned retaining strips 26 being sequentially sheared.

Once all the strips have been sheared, the clip 16 is withdrawn from the plate and the cable 8 will finally become fully tensioned whereupon further movement of the ejection seat will cause withdrawal of the sear 7 and the firing mechanism 6 will initiate the rocket motors of the pack 5. Once the rocket motors of the pack have been initiated the ejection sequence of the seat continues and the cable 8 and the sear 7 remain in the aircraft.

It will be appreciated that a stowage apparatus of the kind described above is not vulnerable to casual damage as is a loose cable. Still further, it will be appreciated that in the event of the apparatus becoming damaged and unserviceable it is a simple matter to fit an entirely new part inclusive of cable, the damaged part either being discarded or being returned to the manufacturer or supplying contractor.

I claim:
1. Apparatus for stowing a cable, comprising
  (1) a rigid former having a solid bottom plate supporting the cable and an open groove extending from the bottom plate, the groove being so dimensioned and shaped that a coiled portion of the cable may be wholly within the groove;
  (2) a plurality of frangible strips retaining the coiled cable portion in the groove,
     (a) the former plate defining a series of radially extending slots receiving the strips and the strips extending across portions of the open groove over the coiled cable portions to retain the cable portion on the bottom plate in the groove; and
  (3) clips retaining opposite ends of the coiled cable portion on the former plate,
     (b) each clip having tongue means passing through openings in the former plate,
  whereby a force sufficient to fracture the frangible strips and to move the tongue means out of said openings and thus to remove the clips releases sequential lengths of the coiled cable portion from the former.

2. The apparatus according to claim 1, wherein a first clip having at least one deformable tongue is provided such clip embracing one part of the cable adjacent said coiled portion thereof;
  said plate defining an opening for receiving said tongue, such tongue being bent so as releasably to retain the part of the cable embraced by the clip adjacent the plate.

3. The apparatus according to claim 2, wherein a second clip having a deformable tongue is provided, such clip embracing a part of the cable adjacent the coiled portion thereof, but remote from, said first clip, structure of the plate defining a second opening for receiving the tongue of said clip, such tongue being bent so as releasably to retain the part of the cable embraced by the second clip adjacent the plate.

4. The apparatus according to claim 1, wherein said groove is of spiral form.

References Cited

UNITED STATES PATENTS

| 2,983,911 | 3/1961 | Rayburn | 242—159 X |
| 3,089,588 | 5/1963 | Correll | 206—59 |
| 3,319,781 | 5/1967 | Simpson et al. | 206—59 |

FOREIGN PATENTS 144,201  11/1951  Australia.

MARTHA L. RICE, Primary Examiner

U.S. Cl. X.R.

89—1; 206—59; 242—159; 244—122